United States Patent
Hill

(10) Patent No.: US 9,945,486 B2
(45) Date of Patent: Apr. 17, 2018

(54) RADIAL SEALING BUTTERFLY VALVE

(71) Applicant: MKS Instruments, Inc., Andover, MA (US)

(72) Inventor: Gordon Hill, Arlington, MA (US)

(73) Assignee: MKS Instruments, Inc., Andover, MA (US)

( * ) Notice: Subject to any disclaimer, the term of this patent is extended or adjusted under 35 U.S.C. 154(b) by 15 days.

(21) Appl. No.: 14/995,727

(22) Filed: Jan. 14, 2016

(65) Prior Publication Data

US 2016/0208929 A1    Jul. 21, 2016

Related U.S. Application Data

(60) Provisional application No. 62/104,285, filed on Jan. 16, 2015.

(51) Int. Cl.
*F16K 1/22* (2006.01)
*F16K 1/226* (2006.01)

(52) U.S. Cl.
CPC ............ *F16K 1/2261* (2013.01); *F16K 1/226* (2013.01); *F16K 1/2263* (2013.01); *F16K 1/2265* (2013.01); *F16K 1/2266* (2013.01)

(58) Field of Classification Search
CPC .......... F16K 1/22; F16K 1/226; F16K 1/2263; F16K 1/2265; F16K 1/2266; F16K 5/0673; F16K 5/0684; F16K 5/0689; F16K 5/201; F16K 5/204; F16K 5/205; F16K 39/028
USPC ....... 251/159, 160, 170, 171, 173, 174, 192, 251/305–307, 314, 316, 317, 358–360, 251/363
See application file for complete search history.

(56) References Cited

U.S. PATENT DOCUMENTS

| | | | | | |
|---|---|---|---|---|---|
| 3,414,234 | A | * | 12/1968 | Henrion | F16K 1/228 251/173 |
| 3,576,198 | A | * | 4/1971 | Bessot | F16K 3/188 137/375 |
| 3,684,239 | A | * | 8/1972 | Schwartzbart | F16K 1/228 251/173 |
| 4,026,514 | A | * | 5/1977 | Sumner | F16K 1/2268 251/152 |
| 5,101,853 | A | * | 4/1992 | Mailliet | B65G 53/46 137/242 |
| 6,139,575 | A | * | 10/2000 | Shu | A61F 2/2403 623/2.12 |
| 6,439,255 | B1 | | 8/2002 | Chamberlain | |
| 6,722,630 | B2 | * | 4/2004 | Oberbeck | F16K 1/2265 251/173 |
| 6,776,394 | B2 | | 8/2004 | Lucas | |

(Continued)

FOREIGN PATENT DOCUMENTS

DE    1550204 A1    4/1970
DE    2625262 A1    12/1977

*Primary Examiner* — Mary McManmon
*Assistant Examiner* — Hailey K Do
(74) *Attorney, Agent, or Firm* — Hamilton, Brook, Smith & Reynolds, P.C.

(57) ABSTRACT

A valve assembly having a valve housing, the valve housing defining a passageway. A flapper valve arranged within the passageway is coupled to a rotatable valve shaft. A flexible wall, sealed along opposed edges to the valve housing, is controllable to at least two positions. The first position seals against the flapper valve and the second position releases the flapper valve allowing for ready movement of the valve.

26 Claims, 7 Drawing Sheets

(56) References Cited

U.S. PATENT DOCUMENTS

| | | |
|---|---|---|
| 6,994,311 B2 | 2/2006 | Duelli |
| 6,994,317 B2 | 2/2006 | Fischer |
| 7,428,915 B2 | 9/2008 | Nguyen et al. |
| 7,658,367 B2 | 2/2010 | Geiser |
| 7,802,772 B2 | 9/2010 | Geiser |
| 7,980,529 B2 | 7/2011 | Seitz |
| 8,123,195 B2 * | 2/2012 | Iwabuchi .............. F16K 1/2266 251/161 |
| 8,833,383 B2 | 9/2014 | Sin |
| 2002/0130290 A1 | 9/2002 | Oberbeck |
| 2010/0032598 A1 | 2/2010 | Iwabuchi |

* cited by examiner

RADIAL SEALING BUTTERFLY VALVE

RELATED APPLICATIONS

This application claims the benefit of U.S. Provisional Application No. 62/104,285, filed Jan. 16, 2015. The entire teachings of the above application are incorporated herein by reference.

BACKGROUND OF THE INVENTION

Butterfly valves are commonly used in vacuum pressure control systems, such as those employed in semiconductor fabrication systems. A butterfly valve, or "flapper valve," typically comprises a thin flapper coaxially disposed within a passageway of the valve housing. The flapper is secured to the valve assembly by a rotatable valve shaft extending laterally across the passageway. Rotation of the valve shaft controls the position of the flapper with respect to the valve housing.

Butterfly valves are capable of providing good control performance and sealing near closed positions by a variety of methods. Most commonly, a radially sealing o-ring is implemented in the flapper. In this case, as the valve approaches the closed position, the o-ring is compressed radially. O-rings are made of an elastomer material allowing them to deform slightly when under compression but having enough elasticity to prevent them from permanent deformation when uncompressed. O-rings can enable a positive vacuum seal of a butterfly valve.

However, the use of o-rings as sealing mechanisms, particularly for valves used in vacuum pressure control systems, carries several disadvantages. O-rings experience a high amount of shear force when sealing, and as a result, they degrade quickly. Additionally, specialized gases used during fabrication processes may react with, or otherwise affect, the elastomer material of the o-ring. Some fabrication processes generate high temperatures and/or pressures which may further degrade the elastomer material.

As a result, o-rings must be replaced frequently. Frequent replacement carries its own disadvantages in addition to the inconvenience of frequent replacement. For example, handling and installing them may introduce contaminants, such as skin oils, lint, or plasticizers from plastic gloves, into an otherwise clean system.

SUMMARY OF THE INVENTION

The valve assembly is designed with a radial sealing mechanism capable of providing vacuum isolation and overcoming several of the disadvantages of utilizing o-rings. The sealing mechanism may be constructed from a thin metal providing added durability and requiring less maintenance.

A valve assembly may comprise a valve housing, the valve housing defining a passageway. A flapper valve arranged within the passageway may be coupled to a rotatable valve shaft. A flexible wall, sealed along opposed edges to the valve housing, may be controllable to at least two positions. The first position seals against the flapper valve and the second position releases the flapper valve, allowing for ready movement of the valve.

A method of operation of a valve assembly may comprise providing a flapper valve within a valve housing, moving the flapper valve to a closed position, and moving a flexible wall against the flapper valve when the flapper valve is in the closed position. The flexible wall may be sealed along opposed edges to the valve housing.

The flexible wall of the valve assembly may be controllable to a range of positions between the first position and the second position, providing variable leakage. The flexible wall may be u-shaped between the opposed edges. One opposed edge of the flexible wall may be displaced radially relative to a second opposed edge. Vacuum isolation may be provided when the flexible wall is in the first position. The valve assembly may comprise an array of actuator arms to control the flexible wall between positions. The actuator arms may pivot about a fulcrum located within the valve housing. The actuator may pivot in response to a pneumatic actuator, a spring, or both. Alternatively, the flexible wall may be controlled between positions by a pneumatic actuator, other pressure regulating actuator, or an electromagnetic actuator. The valve assembly may further comprise an elastomer material, which may be on a perimeter of the flapper valve, coated onto an inner radial perimeter of the flexible wall, or both.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
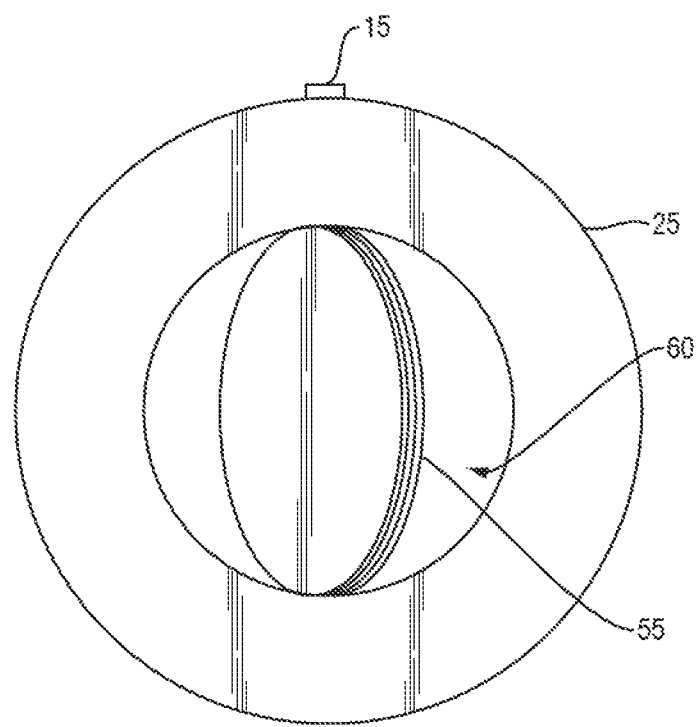
FIG. 1A is a front view of a flapper valve in a substantially open position.
Figure 1B:
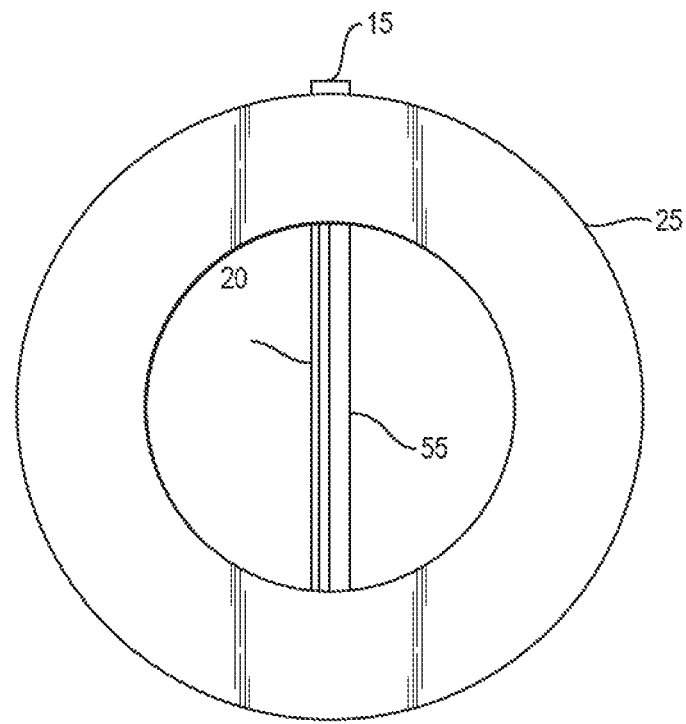
FIG. 1B is a front view of a flapper valve in a completely open position.
Figure 1C:
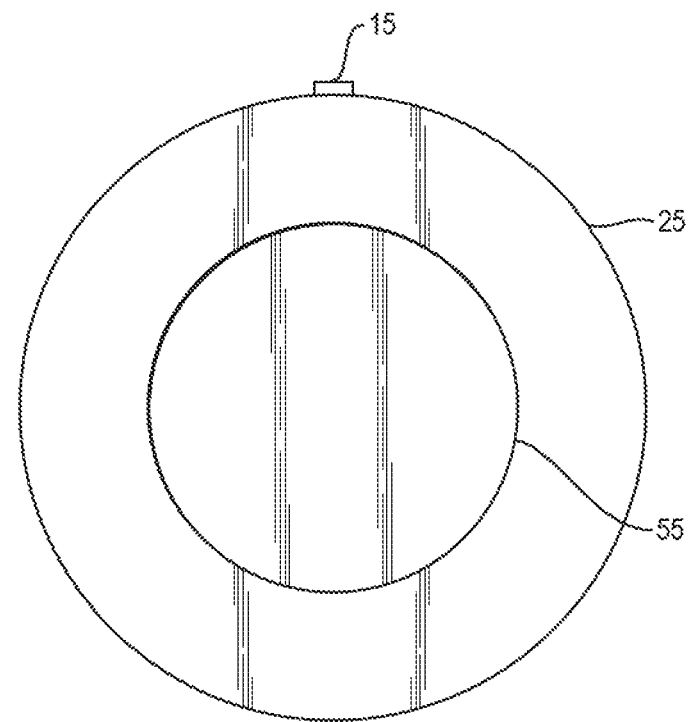
FIG. 1C is a front view of a flapper valve in a closed position.

Movement of a flapper valve 55 in relation to a valve housing 25 is illustrated in FIGS. 1A-1C. In FIG. 1A the flapper valve 55 is shown in a substantially open position. The flapper valve rotates within a valve bore 60. FIG. 1B illustrates the flapper valve 55 in a completely open position. Elastomer material 20 is visible along the circumference of the flapper valve 55. FIG. 1C illustrates the flapper valve 55 in a completely closed position.

Figure 2:
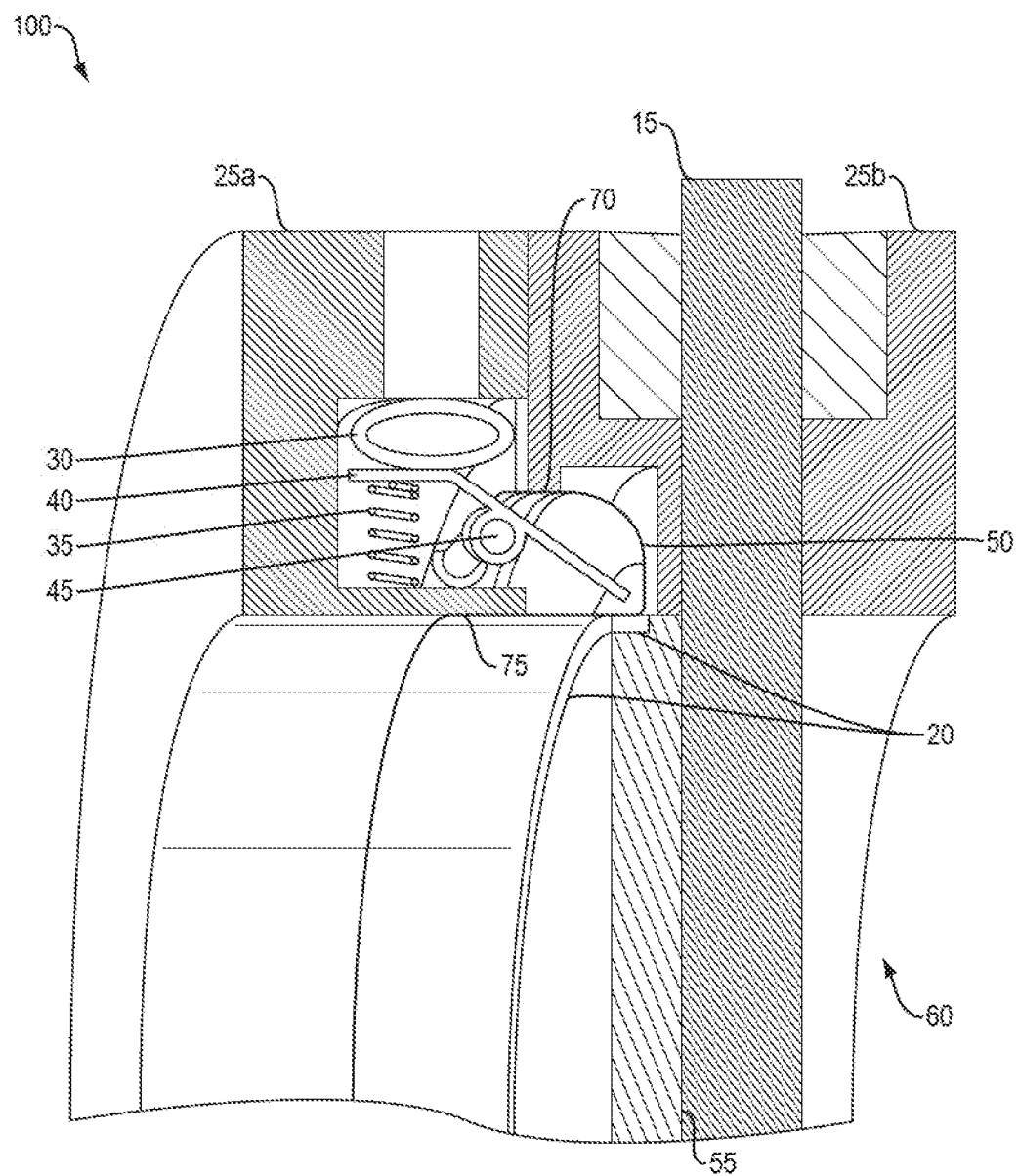
FIG. 2 is a perspective cross-sectional view of a flapper valve having a sealing device constructed in accordance with the present disclosure.

A valve assembly 100 having a valve housing 25a, 25b with the valve bore 60 defining a passageway is shown in FIG. 2. Within the valve bore 60 is a closed flapper valve 55 coupled to a rotatable valve shaft 15 extending across the valve bore 60. The flapper valve 55 includes a thin layer of elastomer material 20 about its circumference. Within the valve housing 25 is a flexible wall 50 sealed at opposed edges 70, 75 to the valve housing 25. The geometry of the flexible wall 50 is u-shaped. Within the valve housing 25 is an actuating mechanism comprising an actuator arm 40, which rotates about a fulcrum 45, a pneumatic tube 30, and a spring 35. A first end of the actuator arm 40 is located between pneumatic tube 30 and spring 35. A second end of the actuator arm 40 is adjacent to and touching the flexible wall 50. Ideally, multiple actuating mechanisms are located within the housing, providing actuation of the flexible wall 50 at several points along the circumference of the valve bore 60.

Figure 3:
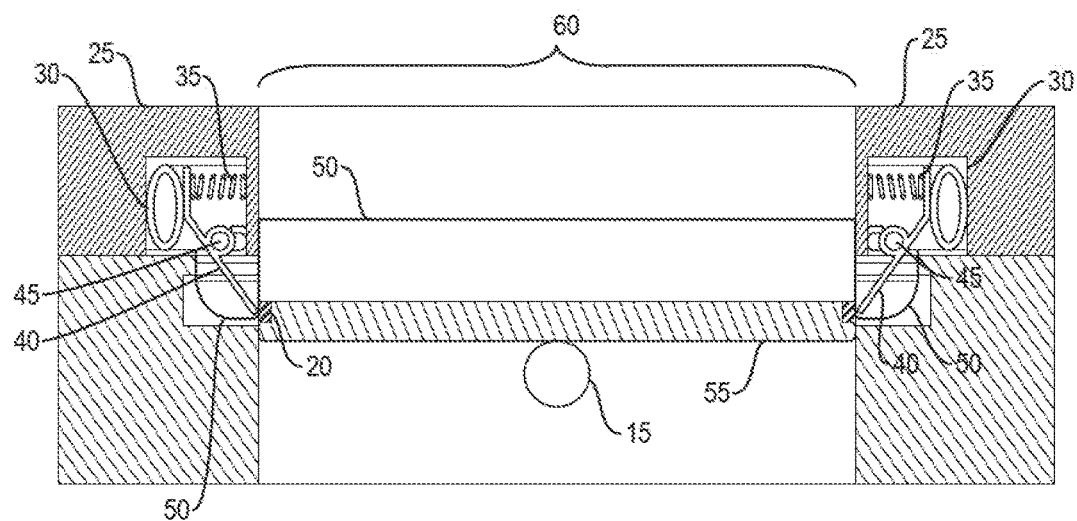
FIG. 3 is a cross-sectional side view of the valve assembly, with the valve shaft extending into the page and the flapper valve in a closed position.
Figure 5:
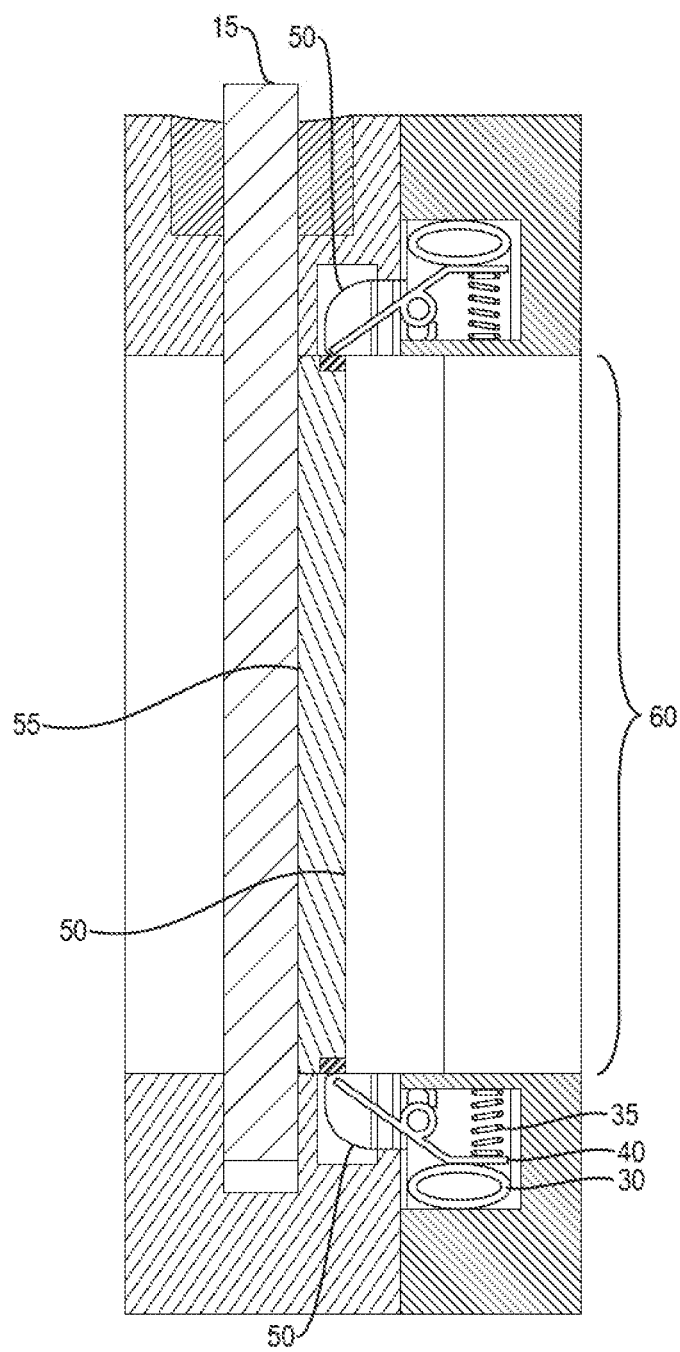
FIG. 5 is a cross-sectional side view of the valve assembly, rotated 90° with regard to FIG. 3 and the valve shaft extending across the page, with the flapper valve in a closed position.

Cross sectional views of the valve assembly 100 with the flapper valve 55 in a closed position are shown in FIGS. 3 and 5. The flexible wall 50 may be constructed from a thin metal, such as stainless steel, capable of deflection. In this embodiment, the u-shaped geometry of the flexible wall 50 permits the wall to deflect inwards, towards the flapper valve 55. In this position, the hoop stress in the flexible wall is minimized. This allows the flexible wall to have significant deflection without compromising fatigue life. The flexible wall provides radial motion capability while maintaining an ideal vacuum cavity.

Figure 4:
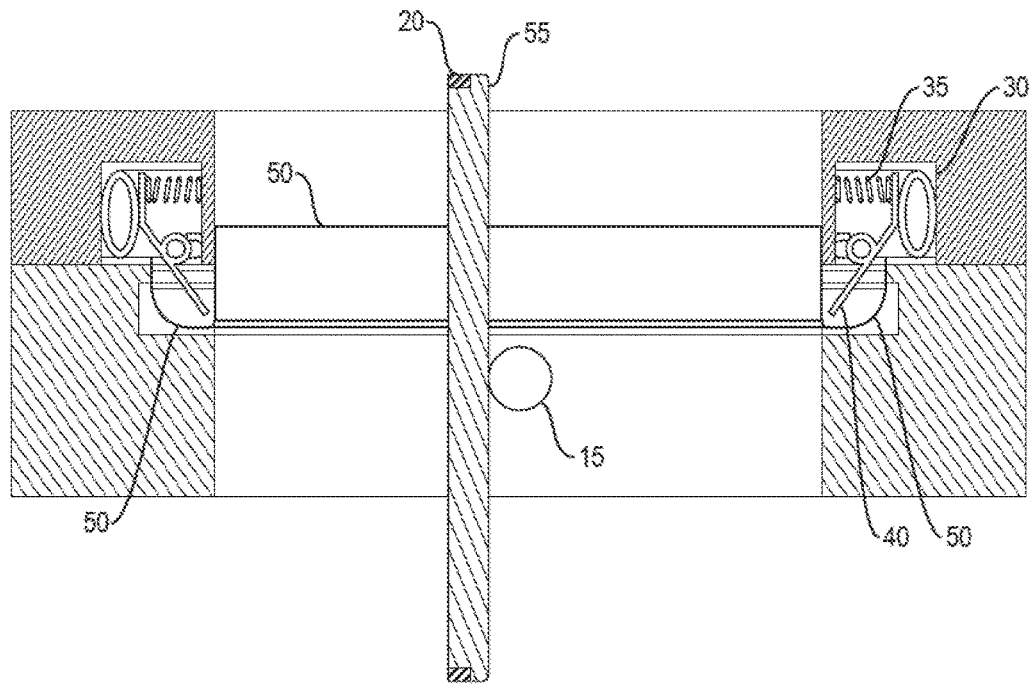
FIG. 4 is a cross-sectional side view of the valve assembly as in FIG. 3 with the flapper valve in an open position.
Figure 6:
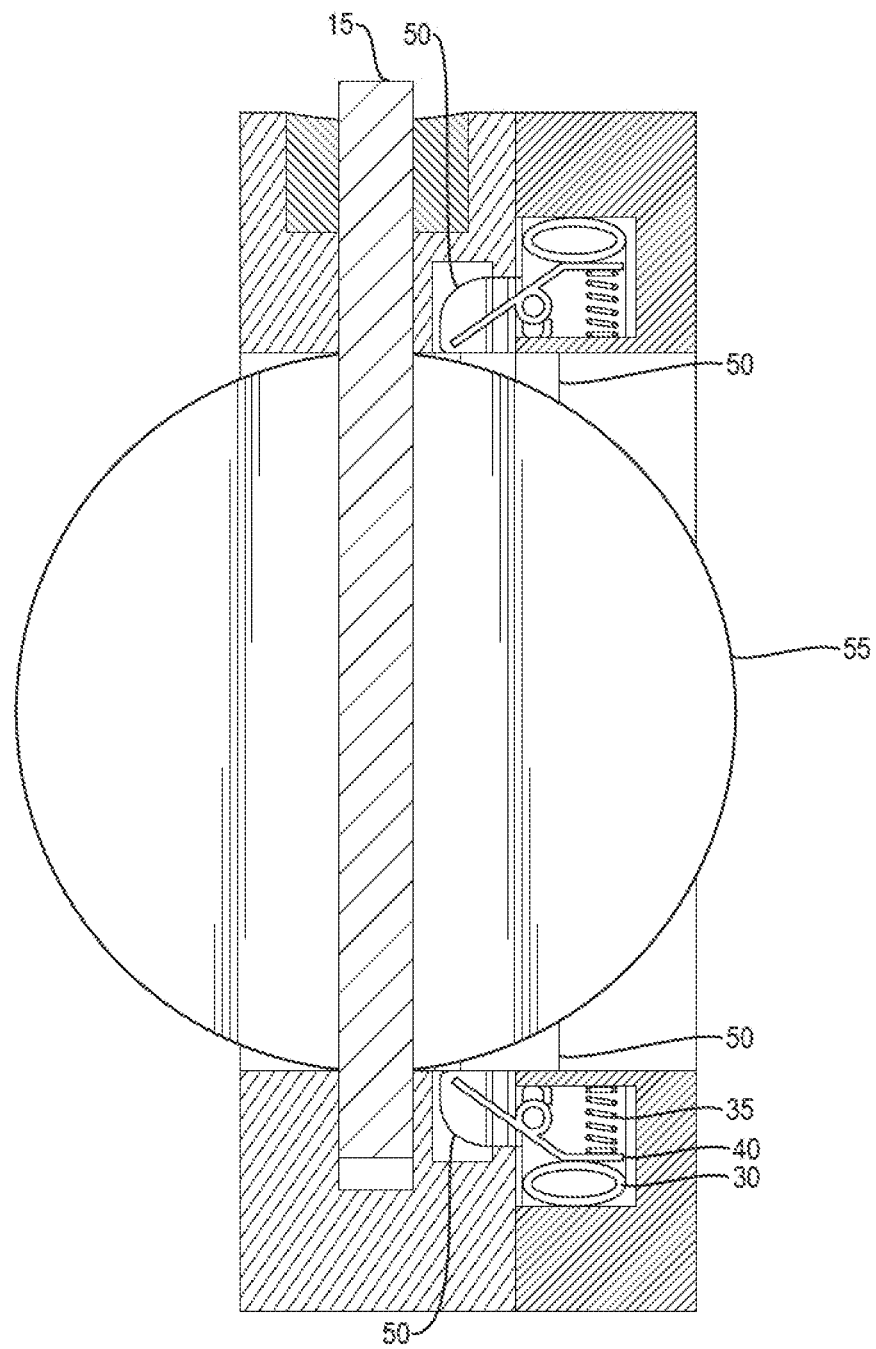
FIG. 6 is a cross-sectional side view of the valve assembly as in FIG. 5 but with the flapper valve in a open position.

Cross sectional views of the valve assembly 100 with the flapper valve 55 in an open position are shown in FIGS. 4 and 6. In this position, the metal wall is deflected outwards from the flapper valve 55 and allows for ready movement of the valve. The movement required for the actuator arm 40 to cause deflection of flexible wall 50 may be subtle (as depicted in FIGS. 3-6) or it may be more pronounced (not shown).

Figure 7:
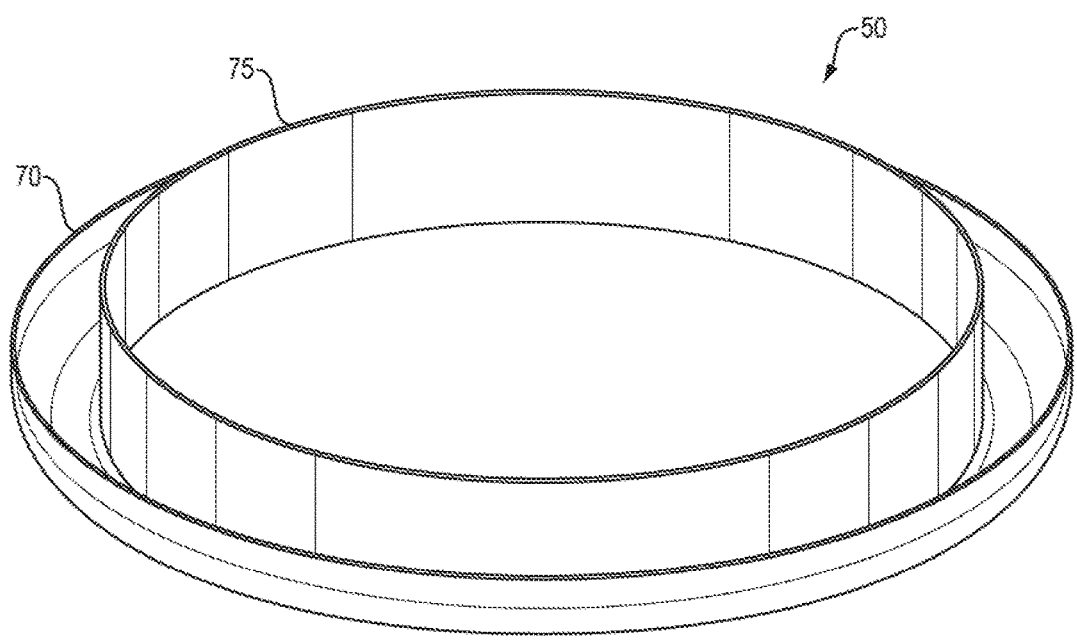
FIG. 7 is a perspective view of a flexible wall outside of a valve housing.

Flexible wall 50, without the valve housing 25, is shown in FIG. 7. The opposed edges 70, 75 are visible. Opposed edge 70 forms the surface of the flexible wall 50 that is internal with respect to valve housing 25a. Opposed edge 75 forms the surface which faces the flapper valve 55.

Actuation of the radial sealing mechanism may operate as follows. The area within the valve housing in which the actuating mechanism resides may be at atmospheric pressure or at a controlled pressure other than atmospheric pressure. Assuming that it is exposed to atmospheric pressure, on the atmosphere side of the flexible wall 50, an array of actuator arms 40, located periodically about the circumference of the valve bore 60, transfers force to provide a compression force to the flexible wall 50. Such transfer force is provided by a spring 35, which applies load to the first end of the actuator arm 40. The pneumatic tube 30 provides a reactionary force to the spring force. In this embodiment, the spring force will cause the valve to seal, and the pneumatic force will cause the valve to unseal. Alternative arrangements are possible. For example, the location of the pneumatic tube and the spring may be reversed. Additionally, with either arrangement, the pneumatic force may cause the valve to seal while the spring force causes the valve to unseal. In yet another alternative embodiment, the force applied to the flexible wall may be accomplished with solely a spring force, or solely a pneumatic force. The pneumatic force may be provided by other types of pneumatic actuators other than pneumatic tube 30. For example, pneumatic cylinders, pneumatic motors, or other pneumatic devices may be used, either alone or in combination. Alternative embodiments may include other pressure regulating devices, such as hydraulic actuators, or electromechanical devices, such as solenoids, to control the flexible wall between positions.

While the embodiment illustrated in valve assembly 100 includes elastomer material 20 located about the circumference of the flapper valve 55, alternative embodiments are possible. For example, the elastomer material may be applied to the inner circumference of the flexible metal wall, to both the flexible metal wall and the flapper valve, or not applied at all. Further, the embodiment illustrated in valve assembly 100 may be combined with other sealing mechanisms, such as the dynamic circumference seal shown in U.S. Pat. No. 6,439,255, which is assigned to the assignee of the present disclosure.

In an alternative embodiment, the flexible wall may be controllable to a range of positions between a first position, sealing against the flapper valve, as depicted in FIGS. 3 and 5, and a second position, allowing for ready movement of the valve, as depicted in FIGS. 4 and 6. The pressure for the pneumatic actuator may be modulated in order to achieve a controllable, variable leak that is close to zero.

The manufacture of the valve assembly 100 may involve a process by which the flexible wall 50 is first welded to the valve housing 25 on the internal surface (outside radial edge 70, as shown in FIG. 2), followed by installation of the actuating mechanisms, followed by a second weld of the flexible wall 50 to the surface of the valve housing 25 which faces the flapper valve 55 (inside radial edge 75, as shown in FIG. 2).

While this invention has been particularly shown and described with references to example embodiments thereof, it will be understood by those skilled in the art that various changes in form and details may be made therein without departing from the scope of the invention encompassed by the appended claims.

What is claimed is:

1. A valve assembly, comprising:
    a valve housing, the valve housing defining a passageway;
    a flapper valve arranged within the passageway and coupled to a rotatable valve shaft;
    a flexible wall sealed along opposed edges to the housing, the flexible wall controllable to at least two positions, including a first position sealing against the flapper valve and a second position releasing the flapper valve to allow for ready movement of the valve; and
    an array of actuator arms, wherein each actuator arm pivots to control the flexible wall between the first position and the second position.

2. The valve assembly of claim 1, wherein the flexible wall is controllable to a range of positions between the first position and the second position to provide variable leakage.

3. The valve assembly of claim 1, wherein the flexible wall is u-shaped between the opposed edges.

4. The valve assembly of claim 1, wherein one opposed edge of the flexible wall is displaced radially relative to a second opposed edge.

5. The valve assembly of claim 1, wherein the flexible wall provides vacuum isolation in the first position.

6. The valve assembly of claim 1, wherein the flexible wall is a u-shaped metal wall.

7. The valve assembly of claim 1, wherein each actuator arm pivots about a fulcrum located within the valve housing.

8. The valve assembly of claim 1, wherein each actuator arm pivots in response to a pneumatic actuator.

9. The valve assembly of claim 1, wherein each actuator arm pivots in response to a spring.

10. The valve assembly of claim 1, further comprising a pressure regulating actuator to control the flexible wall between positions.

11. The valve assembly of claim 1, further comprising an electromechanical actuator to control the flexible wall between positions.

12. The valve assembly of claim 1, further comprising an elastomer material on a perimeter of the flapper valve.

13. The valve assembly of claim 1, further comprising an elastomer material coated onto an inner radial perimeter of the flexible wall.

14. A method of operation, comprising:
providing a flapper valve within a valve housing;
moving the flapper valve to a closed position; and
moving a flexible wall, sealed along opposed edges to the housing, between at least two positions with an array of actuator arms, including a first position sealing against the flapper valve when the flapper valve is in the closed position and a second position releasing the flapper valve to allow for ready movement of the valve, wherein each actuator arm pivots to control the flexible wall between the first position and the second position.

15. The method of claim 14, wherein the flexible wall provides vacuum isolation when the flapper valve is in the closed position.

16. The method of claim 14, wherein the flexible wall is controllable to a range of positions to provide variable leakage.

17. The method of claim 14, wherein the flexible wall is u-shaped between opposed edges.

18. The method of claim 14, wherein one opposed edge of the flexible wall is displaced radially relative to a second opposed edge.

19. The method of claim 14 wherein the flexible wall is a u-shaped metal wall.

20. The method of claim 14, wherein each actuator arm pivots about a fulcrum located within the valve housing.

21. The method of claim 14, wherein each actuator arm pivots in response to a pneumatic tube.

22. The method of claim 14, wherein each actuator arm pivots in response to a spring.

23. The method of claim 14, wherein the flexible wall is controlled to at least two positions by a pressure regulating actuator.

24. The method of claim 14, wherein the flexible wall is controlled to at least two positions by an electromechanical actuator.

25. The method of claim 14, further comprising an elastomer material on a perimeter of the flapper valve.

26. The method of claim 14, further comprising an elastomer material coated onto an inner radial perimeter of the flexible wall.

* * * * *